(12) United States Patent
Kim et al.

(10) Patent No.: US 12,358,657 B2
(45) Date of Patent: Jul. 15, 2025

(54) SUBMINIATURE DRONE COMPRISING ROTARY ARTIFICIAL MUSCLE MOTOR AND OPERATING METHOD THEREOF

(71) Applicant: IUCF-HYU (Industry-University Cooperation Foundation Hanyang University), Seoul (KR)

(72) Inventors: Seon Jeong Kim, Seoul (KR); Jong Woo Park, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 18/490,851

(22) Filed: Oct. 20, 2023

(65) Prior Publication Data

US 2025/0128836 A1 Apr. 24, 2025

(30) Foreign Application Priority Data

Oct. 20, 2023 (KR) ........................ 10-2023-0140943

(51) Int. Cl.
*B64U 30/29* (2023.01)
*B64U 10/13* (2023.01)
*B64U 20/70* (2023.01)
*B64U 30/294* (2023.01)

(52) U.S. Cl.
CPC ............. *B64U 10/13* (2023.01); *B64U 20/70* (2023.01); *B64U 30/294* (2023.01)

(58) Field of Classification Search
CPC ...... B64U 10/13; B64U 20/70; B64U 30/294; B64U 50/19; B64U 30/299; B64U 30/24; A63H 27/12; H02N 10/00
See application file for complete search history.

(56) References Cited

U.S. PATENT DOCUMENTS

| | | | | | |
|---|---|---|---|---|---|
| 1,748,520 | A | * | 2/1930 | Nunwick | A63H 27/12 446/37 |
| 8,083,173 | B2 | * | 12/2011 | Arlton | B64U 50/19 244/17.23 |
| 9,434,471 | B2 | * | 9/2016 | Arlton | B64U 30/21 |
| 11,629,705 | B2 | * | 4/2023 | Li | D02G 3/448 60/527 |
| 12,059,802 | B2 | * | 8/2024 | Ma | D06M 11/74 |
| 12,139,261 | B2 | * | 11/2024 | Kotani | H02K 9/20 |

FOREIGN PATENT DOCUMENTS

KR 10-2221237 B1 3/2021

* cited by examiner

*Primary Examiner* — Joshua D Huson
*Assistant Examiner* — Vicente Rodriguez
(74) *Attorney, Agent, or Firm* — NKL Law; Jae Youn Kim

(57) ABSTRACT

Provided are a subminiature drone including a rotary artificial muscle motor and a method of operating the same. The subminiature drone includes the rotary artificial muscle motor repeatedly twisted and untwisted according to whether a voltage is applied to generate a rotational force so that a coaxial inverted rotor structure including a subminiature propeller can be easily driven, and a subminiature drone can be provided.

21 Claims, 9 Drawing Sheets

SUBMINIATURE DRONE COMPRISING ROTARY ARTIFICIAL MUSCLE MOTOR AND OPERATING METHOD THEREOF

CROSS-REFERENCE TO RELATED APPLICATION

This application claims priority to and the benefit of Korean Patent Application No. 10-2023-0140943 filed on Oct. 20, 2023, the disclosure of which is incorporated herein by reference in its entirety.

BACKGROUND

1. Technical Field

Example embodiments of the present invention relate to a drone, and more specifically, to a subminiature drone and a method of operating the same.

2. Related Art

Drones are unmanned flying vehicles guided by radio waves. Drones have started to be used for defense businesses and are now being used in various fields for industrial, filming, agricultural, pest control, and hobby purposes.

In particular, as in related art 1 (Korean Patent No. 10-2221237), small drones are being developed for use in remote areas or extreme environments in which it is hard for people to live, and furthermore, research is also being conducted on subminiature drones to apply smart dust to drones. Smart dust is a device in which various sensors and communication technologies are integrated in a small device having a size of 1 cm or less and is used for purposes of preventing natural disasters through observation of temperature, precipitation, wind direction, and vibration, measuring biochemical pollution, and understanding battlefield situations. In addition, smart dust is also used for medical purposes for diagnosing diseases by collecting biological signals, and research is being conducted on using smart dust in logistics management or construction fields.

Subminiature drones being currently developed are not easy to miniaturize due to complex power systems and fuel issues. There is a need to continuously research and develop subminiature drones to effectively apply smart dust.

RELATED ART DOCUMENTS

Patent Documents

Korean Patent No. 10-2221237

SUMMARY

Accordingly, example embodiments of the present invention provide a subminiature drone including a rotary artificial muscle motor capable of easily implementing the miniaturization of a drone, and a method of operating the same.

Example embodiments of the present invention provide a subminiature drone including an upper artificial muscle motor and a lower artificial muscle motor which are repeatedly twisted and untwisted to generate rotational forces and are vertically disposed on the same axis, wherein the upper artificial muscle motor has any one twist of a Z twist twisted clockwise and an S twist twisted counterclockwise, and the lower artificial muscle motor has the other twist of the Z twist twisted clockwise and the S twist twisted counterclockwise, a first propeller and a second propeller which are respectively disposed at a portion of an upper portion of the upper artificial muscle motor and a portion of a lower portion of the lower artificial muscle motor and are rotated in opposite directions by respectively receiving the rotational forces from the upper artificial muscle motor and the lower artificial muscle motor, a battery electrically connected to the upper artificial muscle motor and the lower artificial muscle motor, and a body configured to accommodate the upper artificial muscle motor, the lower artificial muscle motor, and the battery.

The subminiature drone may further include a guard unit configured to accommodate the first propeller, the second propeller, and the body and fix each of an uppermost end of the upper artificial muscle motor and a lowermost end of the lower artificial muscle motor.

The guard unit may include two or more upper fixing frames of which a central portion is coupled to the uppermost end of the upper artificial muscle motor and which are disposed radially therefrom, two or more lower fixing frames of which a central portion is coupled to the lowermost end of the lower artificial muscle motor and which are arranged radially therefrom, and two or more support frames which are each disposed upright between the upper fixing frames and the lower fixing frames to support the upper fixing frames and the lower fixing frames.

The upper fixing frames may be disposed at a higher level than the first propeller and are longer than the first propeller, and the lower fixing frames may be disposed at a lower level than the second propeller and are longer than the second propeller.

The guard unit may further include an upper fixing member disposed at the central portion of the two or more upper fixing frames to fix the uppermost end of the upper artificial muscle motor, and a lower fixing member disposed at the central portion of the two or more lower fixing frames to fix the lowermost end of the lower artificial muscle motor.

The guard unit may further include a plurality of central fixing frames coupled to an outermost wall of the body, arranged radially around the body, and connected to the support frames.

The guard unit may further include an upper circular frame positioned at the same level as the first propeller and coupled to the support frames, and a lower circular frame positioned at the same level as the second propeller and coupled to the support frames.

The upper artificial muscle motor may include an upper return spring part formed of a carbon nanotube yarn having any one twist of the Z twist twisted clockwise and the S twist twisted counterclockwise, and an upper driving motor part in which a first polymer is impregnated in a carbon nanotube yarn having the same twist as the upper return spring part.

The upper return spring part and the upper driving motor part which constitute the upper artificial muscle motor may have a size ratio of 1:9 to 3:7.

The first polymer may include a material having a glass-transition temperature (Tg) ranging from 40° C. to 80° C.

The lower artificial muscle motor may include a lower return spring part formed of a carbon nanotube yarn having any one twist of the Z twist twisted clockwise and the S twist twisted counterclockwise, and a lower driving motor part in which a second polymer is impregnated in a carbon nanotube yarn having the same twist as the lower return spring part.

The lower return spring part and the lower driving motor part which constitute the lower artificial muscle motor may have a size ratio of 1:9 to 3:7.

The second polymer may include a material having a glass-transition temperature (Tg) ranging from 40° C. to 80° C.

The body may include an upper hollow rod configured to accommodate the upper artificial muscle motor therein, a lower hollow rod configured to accommodate the lower artificial muscle motor therein, and a central fixing member disposed between the upper hollow rod and the lower hollow rod, coupled to the upper hollow rod and the lower hollow rod, and configured to fix a lowermost end of the upper artificial muscle motor and an uppermost end of the lower artificial muscle motor.

The body may further include a battery accommodation portion disposed to surround outer walls of the upper hollow rod and the lower hollow rod and accommodate the battery.

The upper artificial muscle motor or the lower artificial muscle motor may include a carbon nanotube yarn having a twist of 3,000 twists per meter (TPM) or more.

Example embodiments of the present invention provide a method of operating a subminiature drone, the method including providing subminiature drone including an upper artificial muscle motor and a lower artificial muscle motor vertically disposed on the same axis, wherein the upper artificial muscle motor has any one twist of a Z twist twisted clockwise and an S twist twisted counterclockwise, and the lower artificial muscle motor has the other twist of the Z twist twisted clockwise and the S twist twisted counterclockwise, a first propeller and a second propeller which are respectively disposed at a portion of an upper portion of the upper artificial muscle motor and a portion of a lower portion of the lower artificial muscle motor, a battery electrically connected to the upper artificial muscle motor and the lower artificial muscle motor, and a body configured to accommodate the upper artificial muscle motor, the lower artificial muscle motor, and the battery. A driving voltage received from the battery is applied to both ends of the upper artificial muscle motor and both ends of the lower artificial muscle motor so that the upper artificial muscle motor and the lower artificial muscle motor to which the driving voltage is applied rotate into an untwisted state and the first propeller and the second propeller rotate in opposite directions by receiving rotational forces from the upper artificial muscle motor and the lower artificial muscle motor, which rotate into the untwisted state. The driving voltage is removed or a reference voltage less than the driving voltage is applied to the upper artificial muscle motor and the lower artificial muscle motor so that the upper artificial muscle motor and the lower artificial muscle motor rotate into twisted state and the first propeller and the second propeller rotate in opposite directions by receiving rotational forces from the upper artificial muscle motor and the lower artificial muscle motor, which rotate into the twisted state.

In the subminiature drone, the upper artificial muscle motor may further include an upper return spring part formed of a carbon nanotube yarn having any one twist of the Z twist twisted clockwise and the S twist twisted counterclockwise, and an upper driving motor part in which a first polymer material is impregnated in a carbon nanotube yarn having the same twist as the upper return spring part. When the driving voltage is applied to the upper artificial muscle motor, as a volume of the first polymer in the upper driving motor part expands due to Joule heat generated from the carbon nanotube yarn, the upper driving motor part may rotate in a direction opposite to the twist to become untwisted. When the driving voltage applied to the upper artificial muscle motor is removed or a reference voltage less than the driving voltage is applied, as the expanded first polymer contracts, the untwisted upper driving motor part may rotate in an original twisting direction.

When the upper driving motor part rotates into the untwisted state, the upper return spring part may rotate in a twisting direction to be further twisted, and when the upper driving motor part rotates into a twisted state, the upper return spring part may rotate in a direction opposite to the twisting direction to restore the original number of twists.

In the subminiature drone, the lower artificial muscle motor may further include a lower return spring part formed of a carbon nanotube yarn having any one twist of the Z twist twisted clockwise and the S twist twisted counterclockwise, and a lower driving motor part in which a second polymer is impregnated in a carbon nanotube yarn having the same twist as the lower return spring part. When the driving voltage is applied to the lower artificial muscle motor, as a volume of the second polymer in the lower driving motor part expands due to Joule heat generated from the carbon nanotube yarn, the lower driving motor part may rotate in a direction opposite to the twist to become untwisted. When the driving voltage applied to the lower artificial muscle motor is removed or a reference voltage less than the driving voltage is applied, as the expanded second polymer contracts, the untwisted lower driving motor part may rotate in an original twisting direction.

When the lower driving motor part rotates into the untwisted state, the lower return spring part may rotate in the twisting direction to be further twisted, and when the lower driving motor part rotates in the twisted state, the lower return spring part may rotate in a direction opposite to the twisting direction to restore the original number of twists.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Hereinafter, example embodiments of the present invention will be described in detail with reference to the accompanying drawings.

The present invention allows various modifications and variations, and specific embodiments thereof are exemplified with reference to the drawings and will be described in detail. However, this is not intended to limit the present invention to particular modes of practice, and it is to be appreciated that all changes, equivalents, and substitutes compliant with the spirit or scope of the present invention defined by the appended claims.

It will be understood that when a first element such as a layer, a region, or a substrate is referred to as being "on" a second element, the first element can be directly on the second element or intervening elements may be present.

It will be understood that although terms such as "first" and "second" may be used herein to describe various elements, components, areas, layers, and/or regions, the elements, components, areas, layers, and/or regions should not be limited by these terms.

Embodiment

Figure 1:
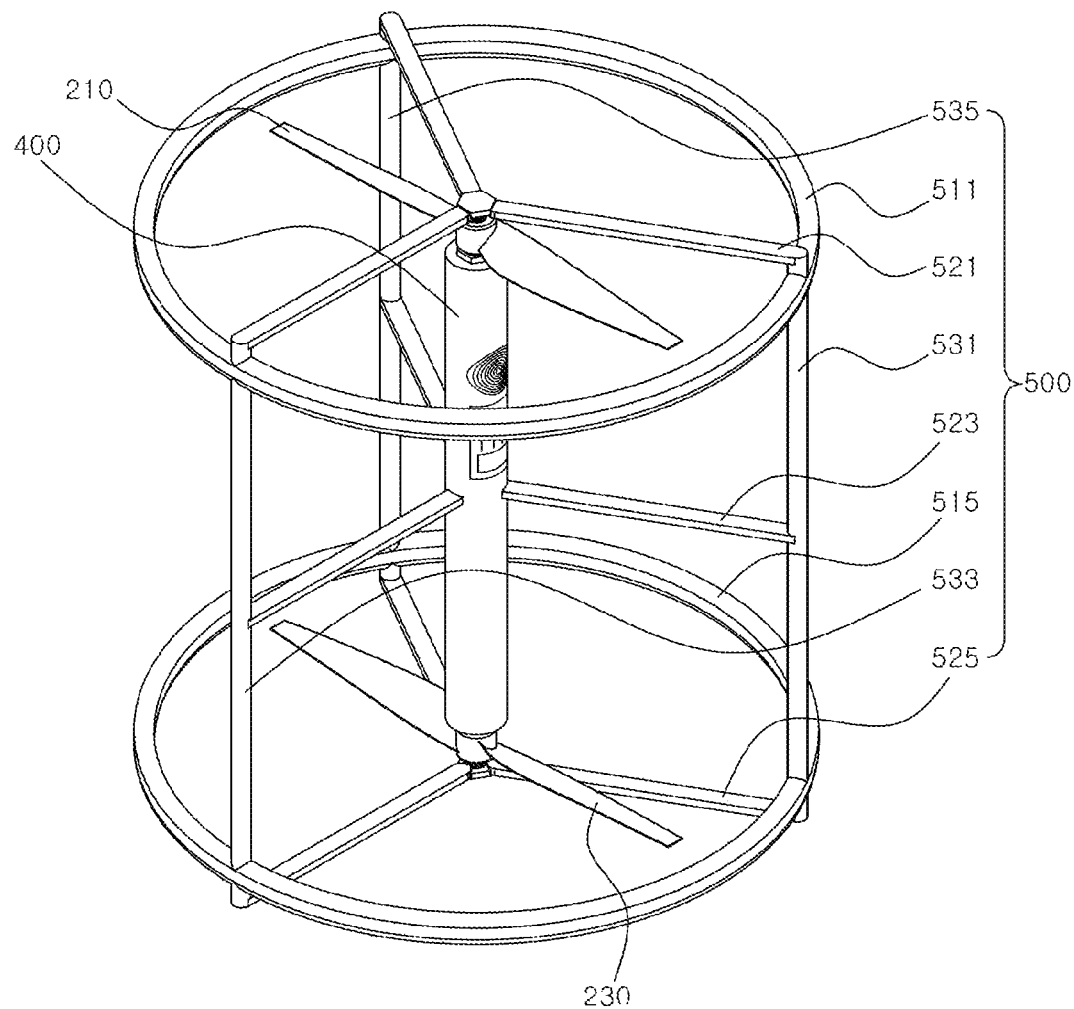
FIG. 1 is an isometric view of a subminiature drone including a rotary artificial muscle motor according to one example embodiment of the present invention.
Figure 2:
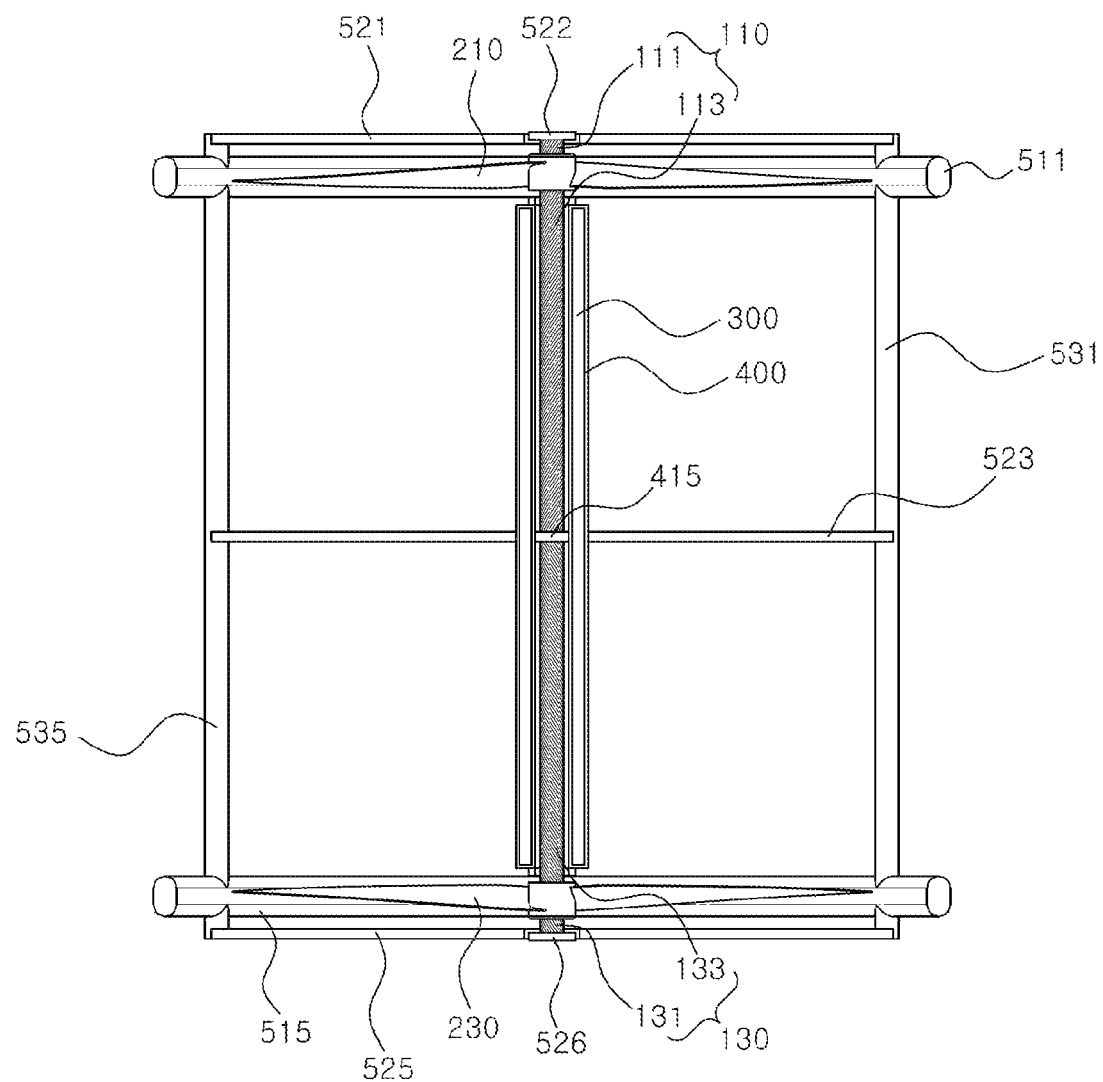
FIG. 2 is a cross-sectional view of the subminiature drone including the rotary artificial muscle motor according to one example embodiment of the present invention.
Figure 3:
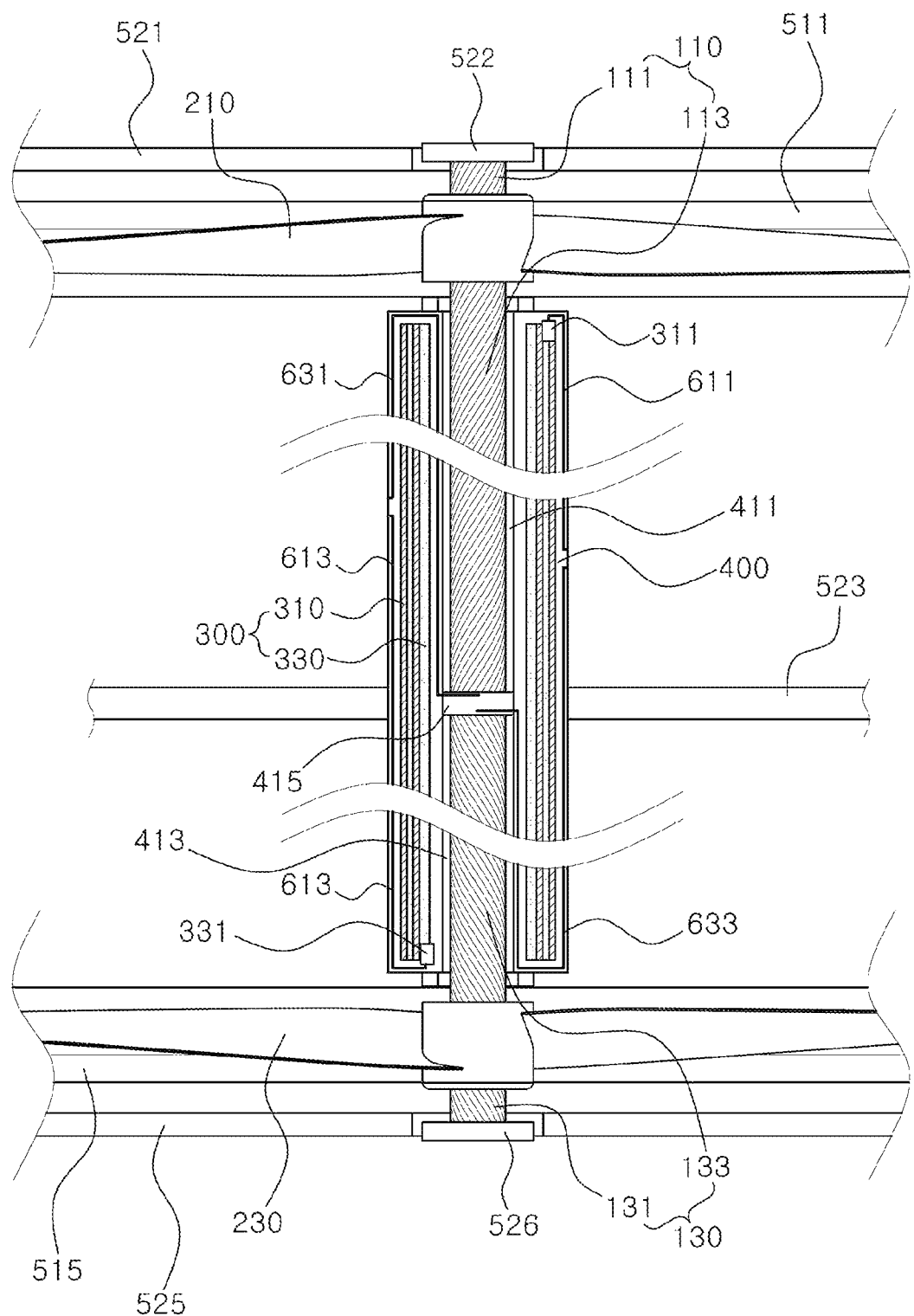
FIG. 3 is an enlarged cross-sectional view of the subminiature drone including the rotary artificial muscle motor according to one example embodiment of the present invention.

FIG. 1 is an isometric view of a subminiature drone including a rotary artificial muscle motor according to one example embodiment of the present invention, and FIG. 2 is a cross-sectional view of the subminiature drone including the rotary artificial muscle motor according to one example embodiment of the present invention. FIG. 3 is an enlarged cross-sectional view of the subminiature drone including the rotary artificial muscle motor according to one example embodiment of the present invention.

Referring to FIGS. 1 to 3, the subminiature drone including the rotary artificial muscle motor according to one example embodiment of the present invention may include an upper artificial muscle motor 110 and a lower artificial muscle motor 130 which are repeatedly twisted and untwisted to generate a rotational force and are vertically disposed on the same axis, wherein the upper artificial muscle motor 110 has any one twist of a Z twist twisted clockwise and an S twist twisted counterclockwise, and the lower artificial muscle motor 130 has the other twist of the Z twist twisted clockwise and the S twist twisted counterclockwise, a first propeller 210 and a second propeller 230 which are respectively disposed at a portion of an upper portion of the upper artificial muscle motor 110 and a portion of a lower portion of the lower artificial muscle motor 130 and are rotated in opposite directions by respectively receiving rotational forces from the upper artificial muscle motor 110 and the lower artificial muscle motor 130, a battery 300 electrically connected to the upper artificial muscle motor 110 and the lower artificial muscle motor 130, and a body 400 which accommodates the upper artificial muscle motor 110, the lower artificial muscle motor 130, and the battery 300.

The upper artificial muscle motor 110 and the lower artificial muscle motor 130 may include carbon nanotube yarns having a twisted shape. The carbon nanotube yarns may be formed by twist spinning a carbon nanotube sheet, on which carbon nanotubes are arranged in almost the same direction, in an Archimedean structure or a dual-Archimedean structure, wherein the carbon nanotube sheet may be obtained from a carbon nanotube forest in which carbon nanotubes are grown on a substrate in almost the same direction. However, the twisted shape is not limited thereto. In one example embodiment, the carbon nanotube forest may have a height of 250 μm to 350 μm and a density of 40 mg/cm$^3$ to 70 mg/cm$^3$.

In one example embodiment, each of the upper artificial muscle motor 110 and the lower artificial muscle motor 130 may have a length of 5 mm to 10 mm, an average diameter of 50 μm to 100 μm, and a weight of 20 μg to 100 μg, but the present invention is not limited thereto. In addition, each of the upper artificial muscle motor 110 and the lower artificial muscle motor 130 may have a maximum rotation angle of 70°/mm to 90°/mm, a maximum rotation speed of 8,000 RPM to 12,000 RPM, and a maximum output torque of 6 Nm/kg to 9 Nm/kg, but the present invention is not limited thereto.

The carbon nanotube yarn may have a twisted form and may have thread characteristics that vary according to a twist direction and the number of twists. Generally, a Z twist may refer to a yarn being twisted in a left direction, that is, clockwise, and an S twist may refer to a yarn being twisted in a right direction, that is, counterclockwise.

Specifically, the upper artificial muscle motor 110 and the lower artificial muscle motor 130 may include carbon nanotube yarns having a twist of 3,000 twists per meter (TPM) or more. That is, the upper artificial muscle motor 110 and the lower artificial muscle motor 130 may be motors in which two carbon nanotube yarns are vertically arranged on the same axis, and each carbon nanotube yarn has a twist of 3,000 TPM or more. Here, TPM represents the number of twists per meter. In another example embodiment, the upper artificial muscle motor 110 and the lower artificial muscle motor 130 may be in a state in which twisted yarns are further twisted to overlap each other to form a coil, that is, coiled. However, the upper artificial muscle motor 110 and the lower artificial muscle motor 130 which are in an uncoiled state may be more advantageous in generating a rotational force.

As described above, according to the present invention, by using the carbon nanotube yarns with a twist of 3,000 TPM or more as the upper artificial muscle motor 110 and the lower artificial muscle motor 130, the upper artificial muscle motor 110 and the lower artificial muscle motor 130 may be repeatedly twisted and untwisted at an appropriate level to generate a rotational force, thereby effectively providing lift for driving the subminiature drone. When the number of twists of the carbon nanotube yarns constituting the upper artificial muscle motor 110 and the lower artificial muscle motor 130 is less than 3,000 TPM, a rotational force sufficient to drive the subminiature drone may not be generated, and thus the subminiature drone may not operate normally. In another example embodiment, the upper artificial muscle motor 110 and the lower artificial muscle motor 130 may include a plurality of carbon nanotube yarns having a twist of 3,000 TPM to 10,000 TPM.

The upper artificial muscle motor 110 and the lower artificial muscle motor 130 may be vertically disposed on the same axis. The upper artificial muscle motor 110 may have any one twist of a Z twist twisted clockwise and an S twist twisted counterclockwise, and the lower artificial muscle motor 130 may have the other twist of the Z twist twisted clockwise and the S twist twisted counterclockwise. In one example embodiment, the upper artificial muscle motor 110 may have a Z twist twisted clockwise, and the lower artificial muscle motor 130 may have an S twist twisted counterclockwise.

The upper artificial muscle motor 110 and the lower artificial muscle motor 130 may have a high electrical conductivity of 400 S/cm or less, but the present invention is not limited thereto.

The first propeller 210 may be attached to an outer portion of the upper portion of the upper artificial muscle motor 110 using an adhesive. A region of the upper artificial muscle motor 110 to which the first propeller 210 is coupled and a region below the region may be defined as an upper driving motor part 113, and a region above the region of the upper artificial muscle motor 110 to which the first propeller 210 is coupled may be defined as an upper return spring part 111. In other words, the upper artificial muscle motor 110 may be a motor in which the upper return spring part 111 and the upper driving motor part 113 are vertically arranged.

Specifically, the upper artificial muscle motor 110 may be a motor in which the upper return spring part 111 formed of a carbon nanotube yarn having any one twist of a Z twist twisted clockwise and an S twist twisted counterclockwise and the upper driving motor part 113 in which a first polymer is impregnated in a carbon nanotube fiber having the same twist as the upper return spring part 111 are integrally formed.

The upper return spring part 111 and the upper driving motor part 113, which constitute the upper artificial muscle motor 110, may have a size ratio of 1:9 to 3:7. When the upper return spring part 111 has a size smaller than the 1:9 size ratio of the upper return spring part 111 and the upper driving motor part 113, it may be difficult for the upper driving motor part 113 to be quickly returned to a twisted state by the upper return spring part 111, and stability against repeated twisting and untwisting may be reduced. When the upper return spring part 111 has a size larger than the 3:7 size ratio of the upper return spring part 111 and the upper driving motor part 113, since the upper driving motor part 113 becomes shorter, a rotational force generated through repeated twisting and untwisting may decrease.

In addition, the second propeller 230 may be coupled to an outer portion of the lower portion of the lower artificial muscle motor 130 using an adhesive. A region of the lower artificial muscle motor 130 to which the second propeller 230 is coupled and a region below the region may be defined as a lower driving motor part 133, and a region above the region of the lower artificial muscle motor 130 to which the second propeller 230 is coupled may be defined as a lower return spring part 131. In other words, the lower artificial muscle motor 130 may be a motor in which the lower return spring part 131 and the lower driving motor part 133 are vertically disposed.

Specifically, the lower artificial muscle motor 130 may be a motor in which the lower return spring part 131 formed of a carbon nanotube yarn having any one twist of a Z twist twisted clockwise and an S twist twisted counterclockwise and the lower driving motor part 133 in which a second polymer is impregnated in a carbon nanotube yarn having the same twist as the lower return spring part 131 are integrally formed. The lower return spring part 131 and the lower driving motor part 133, which constitute the lower artificial muscle motor 130, may have a size ratio of 1:9 to 3:7. The size ratio may be similar to the size ratio of the upper return spring part 111 and the upper driving motor part 113 in the upper artificial muscle motor 110.

As described above, a portion of a carbon nanotube yarn constituting the artificial muscle motor 110 or 130 is impregnated with the polymer to form the driving motor part 113 or 133, and the remaining portion which is not impregnated with the polymer may be defined as the return spring part 111 or 131, so that the artificial muscle motor 110 or 130 can be changed from the twisted state to the untwisted state and be changed from the untwisted state to the twisted state more effectively.

The first polymer or the second polymer may be impregnated into the carbon nanotube yarn and disposed between a plurality of carbon nanotubes in the carbon nanotube yarn. The first polymer or the second polymer may each independently include polymer having a glass-transition temperature (Tg) ranging from of 40° C. to 80° C. In general, glass transition temperature refers to the temperature at which the molecules within polymer chains begin to be in motion depending on the temperature. In an embodiment of the present invention, by impregnating carbon nanotube yarns with a polymer material capable of phase change in a specific temperature range, twisting and untwisting of the artificial muscle motors 110 and 130 can be induced through the phase change of the polymer material. Specifically, for example, the first polymer and the second polymer may be selected from paraffin wax, polystyrene-poly(ethylene-butylene)-polystyrene copolymer, polyurethane, and perfluorosulfonic acid polyethylene oxide, regardless of each other.

The first propeller 210 may be coupled to a portion of the upper portion of the upper artificial muscle motor 110, and the second propeller 230 may be coupled to a portion of the lower portion of the lower artificial muscle motor 130. The first propeller 210 may be connected to the upper artificial muscle motor 110, specifically, the upper driving motor part 113, to rotate by receiving a rotational force from the upper artificial muscle motor 110. The second propeller 230 may be connected to the lower artificial muscle motor 110, specifically, the lower driving motor part 133, to rotate by receiving a rotational force from the lower artificial muscle motor 110.

Figure 4:
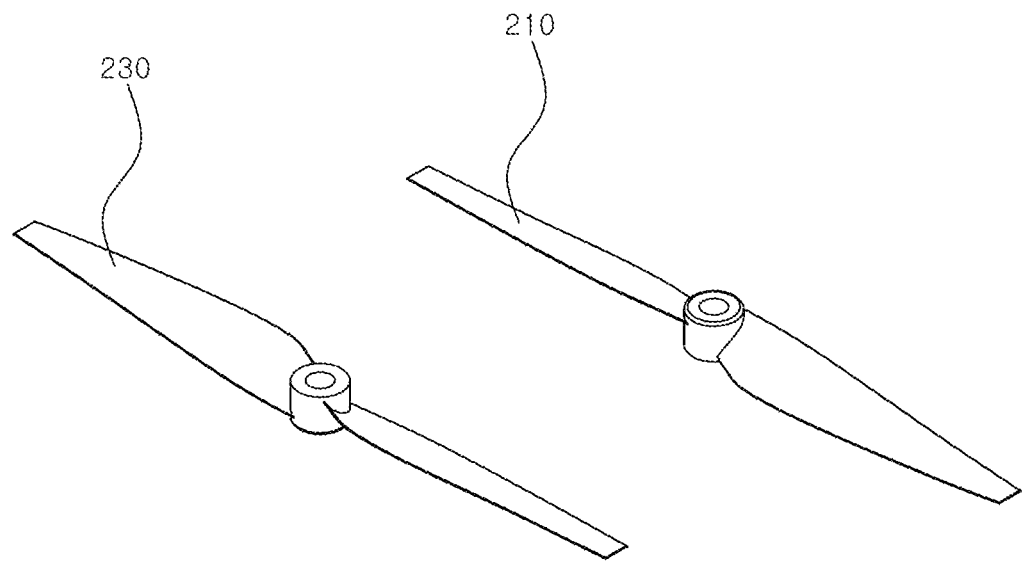
FIG. 4 is a schematic view illustrating a first propeller and a second propeller of the subminiature drone including the rotary artificial muscle motor according to one example embodiment of the present invention.

FIG. 4 is a schematic view illustrating the first propeller and the second propeller of the subminiature drone including the rotary artificial muscle motor according to one example embodiment of the present invention.

Referring to FIGS. 1 to 4 together, in one example embodiment, when the upper artificial muscle motor 110 has a Z twist, since the Z twist is untwisted counterclockwise when driving voltage is applied, as the first propeller 210, a counterclockwise (CCW) propeller that rotates counterclockwise may be used. In addition, when the lower artificial muscle motor 130 has an S twist, since the S twist is untwisted clockwise during driving voltage is applied, a clockwise (CW) propeller that rotates clockwise may be used for the second propeller 230. In another example, when the upper artificial muscle motor 110 has an S twist, the first propeller 210 may be a CW propeller that rotates clockwise, and when the lower artificial muscle motor 130 has a Z twist, the second propeller 230 may be a CCW propeller that rotates counterclockwise.

In one example embodiment, the first propeller 210 and the second propeller 230 may be formed of a polymer material such as SU-8 in consideration of durability and weight. Each of the first propeller 210 and the second propeller 230 may have a diameter of 7 mm to 9 mm, a thickness of 400 μm to 1.5 mm, and a weight of 50 ng to 100 ng. Each of the first propeller 210 and the second propeller 230 may include 2 to 4 blades in consideration of target lift and motor output power and may have a pennation angle of 15° to 45°. Preferably, the first propeller 210 and the second propeller 230 may have a low pennation angle of 5° to 25° to maximize lift.

The first propeller 210 and the second propeller 230 may be formed using a tilted lithography or inclined lithography technique based on a typical ultraviolet (UV) lithography technology. Alternatively, a nanoscale precision additive manufacturing technique such as two photon beam lithography, holographic lithography, or a nanoscribe technique may be used.

Referring again to FIGS. 1 to 3, the body 400 may include an upper hollow rod 411 that accommodates the upper artificial muscle motor 110 therein, a lower hollow rod 413 that accommodates the lower artificial muscle motor 130 therein, and a central fixing member 415 disposed between the upper hollow rod 411 and the lower hollow rod 413 and coupled to the upper hollow rod 411 and the lower hollow rod 413.

The upper artificial muscle motor 110, specifically, the upper driving motor part 113, is positioned in the upper hollow rod 411, and a lowermost end of the upper artificial muscle motor 110, specifically, a lowermost end of the upper driving motor part 113, may be fixed to the central fixing member 415 using an adhesive or the like. In addition, the lower artificial muscle motor 130, specifically, the lower driving motor part 133, may be positioned in the lower hollow rod 413, and an uppermost end of the lower artificial muscle motor 130, specifically, an uppermost end of the lower driving motor part 133, may be fixed to the central fixing member 415 using an adhesive or the like.

In addition, the upper driving motor part 113 may protrude above the upper hollow rod 411, and a portion of the upper driving motor part 113 protruding above the upper hollow rod 411 may be coupled to the first propeller 210. Here, the upper hollow rod 411 and the first propeller 210 may be arranged to be spaced apart from each other by a certain interval. Likewise, the lower driving motor part 133 may protrude below the lower hollow rod 413, and a portion of the lower driving motor part 133 protruding below the lower hollow rod 413 may be coupled to the second propeller 230. Here, the lower hollow rod 413 and the second propeller 230 may be arranged to be spaced apart from each other by a certain interval.

In addition, the body 400 may include a battery accommodation portion on outer walls of the upper hollow rod 411 and the lower hollow rod 413. The battery accommodation portion may provide a space for accommodating the battery 300 to be described below and may be disposed to surround the outer walls of the upper hollow rod 411 and the lower hollow rod 413. However, the body 400 may be provided by appropriately adjusting the shape and position thereof through the arrangement of the upper artificial muscle motor 110, the lower artificial muscle motor 130, and the battery accommodation portion. Since the upper artificial muscle motor 110, the lower artificial muscle motor 130, and the battery 300 may generate heat when the drone is driven, the body 400 that accommodates the upper artificial muscle motor 110, the lower artificial muscle motor 130, and the battery 300 may be formed of a material including a metal or carbon material having high heat radiation performance.

The battery 300 may be disposed to surround the outer walls of the upper hollow rod 411 and the lower hollow rod 413 in the battery accommodation portion. For the battery 300, a high-output and high-safety battery material such as a lithium titanate (LTO) battery material, a lithium iron phosphate (LFP) battery material, or a nickel cadmium (NiCd) battery material may be used, but the present invention is limited thereto.

Specifically, the battery 300 may include a positive electrode film 310, a negative electrode film 330, and a separator (not shown) disposed between the positive electrode film 310 and the negative electrode film 330. The battery 300 may be formed by alternately arranging the positive electrode film 310 and the negative electrode film 330. A positive electrode tab 311 may be provided at one side of the positive electrode film 310, and a negative electrode tab 331 may be provided at one side of the negative electrode film 330.

The subminiature drone may further include a guard unit 500 which accommodates the first propeller 210, the second propeller 230, and the body 400 and fixes an uppermost end of the upper artificial muscle motor 110, specifically, an uppermost end of the upper return spring part 111, and a lowermost end of the lower artificial muscle motor 130, specifically, a lowermost end of the lower return spring part 131.

The guard unit 500 may protect the first propeller 210 and the second propeller 230 and may control air flow to increase flight efficiency. At the same time, the guard unit 500 performs multiple functions of mechanically fixing the upper artificial muscle motor 110 and the lower artificial muscle motor 130 and supplying power through circuit connection, thereby assisting in reducing the weight of the subminiature drone of the present invention.

The guard unit 500 includes two or more upper fixing frames 521 of which a central portion is coupled to the uppermost end of the upper artificial muscle motor 110 and which are disposed radially therefrom, two or more lower fixing frames 525 of which a central portion is coupled to the lowermost end of the lower artificial muscle motor 130 and which are arranged radially therefrom, and two or more support frames 531, 533, and 535 which are each disposed upright between the upper fixing frames 521 and the lower fixing frames 525 to support the upper fixing frames 521 and the lower fixing frames 525. Here, the number of upper fixing frames 521, the number of lower fixing frames 525, and the number of support frames 531, 533, and 535 may be the same. In the present embodiment, since three upper fixing frames 521 and three lower fixing frames 525 are provided, three support frames 531, 533, and 535 are also shown.

The radially disposed upper fixing frames 521 may include an upper fixing member 522, which fixes the uppermost end of the upper artificial muscle motor 110, at the central portion thereof. The uppermost end of the upper artificial muscle motor 110 may be fixed to the upper fixing member 522 using an adhesive or the like. The upper fixing frames 521 may be disposed radially from the upper fixing member 522.

Likewise, the radially arranged lower fixing frames 525 may include a lower fixing member 526, which fixes the lowermost end of the lower artificial muscle motor 130, at the central portion thereof. The lowermost end of the lower artificial muscle motor 130 may be fixed to the lower fixing member 526 using an adhesive or the like. The lower fixing frames 525 may be arranged radially from the lower fixing member 526.

The upper fixing frames 521 may be disposed at a higher level than the first propeller 210 and may be longer than the first propeller 210, and the lower fixing frames 525 may be disposed at a lower level than the second propeller 230 and may be longer than the second propeller 230. As a result, the first propeller 210, the second propeller 230, and the body 400 may be accommodated and protected in a space formed by the upper fixing frames 521, the lower fixing frames 525, and the support frames 531, 533, and 535 that are coupled thereto outside the upper fixing frames 521 and the lower fixing frames 525 to support the upper fixing frames 521 and the lower fixing frames 525.

In addition, the central portion of the radially arranged upper fixing frames 521 may be coupled to the uppermost end of the upper artificial muscle motor 110, specifically, the uppermost end of the upper return spring part 111, and also the central portion of the radially arranged lower fixing frames 525 may be coupled to the lowermost end of the lower artificial muscle motor 130, specifically, the uppermost end of the lower return spring part 131. In this case, the upper and lower fixing frames 521 and 525 may stably fix the upper artificial muscle motor 110 and the lower artificial muscle motor 130 to stably support repetitive twisting and untwisting of the upper and lower artificial muscle motors 110 and 130. In particular, the upper and lower fixing frames 521 and 525 may stably fix the upper and lower return spring parts 111 and 131, thereby allowing the upper and lower artificial muscle motors 110 and 130 to quickly return to a twisted shape.

In addition, the guard unit 500 may include an upper circular frame 511 which is positioned at a lower level than the upper fixing frames 521, specifically, at the same level as the first propeller 210, and is coupled to the support frames 531, 533, and 535, and a lower circular frame 515 which is positioned at a level higher than the lower fixing frames 525, specifically, at the same level as the second propeller 230, and is coupled to the support frames 531, 533, and 535. Since the upper and lower circular frames 511 and 515 are positioned outside the propellers 210 and 230 at the same level, the propellers 210 and 230 can be more effectively protected.

In addition, the guard unit 500 may further include a plurality of central fixing frames 523 coupled to an outermost wall of the body 400 and disposed radially around the body 400. Accordingly, the body 400 can be more effectively protected.

In one example embodiment, the body 400 and the guard unit 500 may be formed of a polymer material such as SU-8 in consideration of durability and weight. The weight of the body 400 and the guard unit 500 may be in a range of 120 μg to 150 μg. The diameter and height of the subminiature drone of the present invention may each be less than 1 cm.

Figure 5:
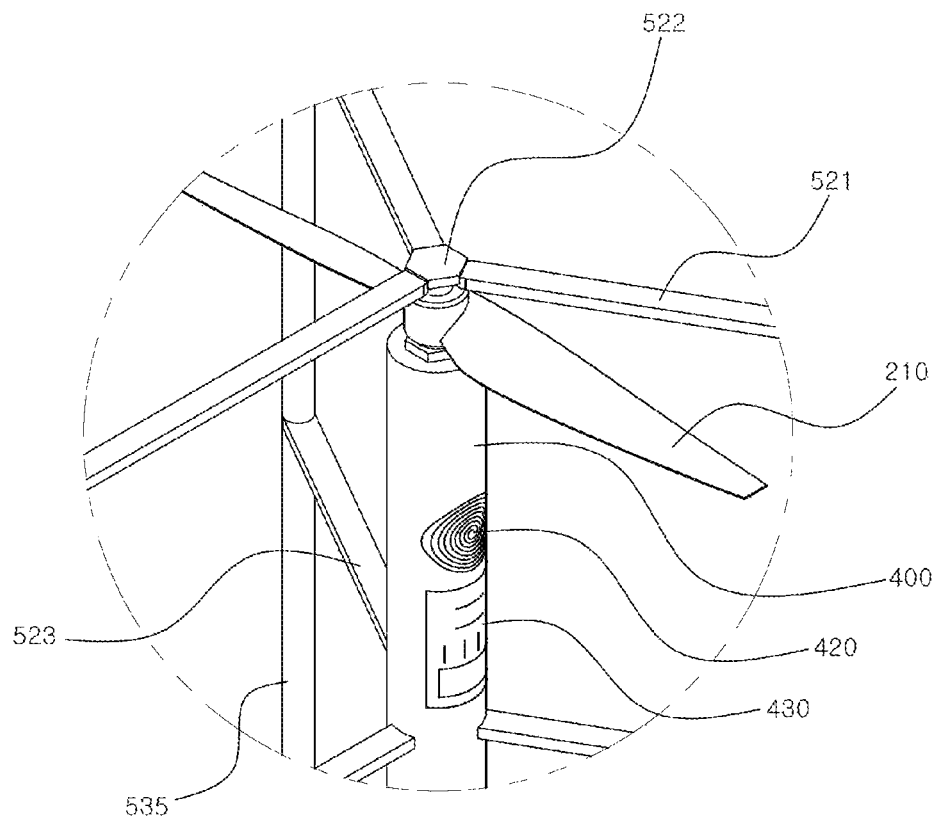
FIG. 5 is an enlarged isometric view of a case in which a wireless signal transceiver and a high-voltage pulse wave generation controller are provided in a subminiature drone including a rotary artificial muscle motor equipped according to one example embodiment of the present invention.
Figure 6:
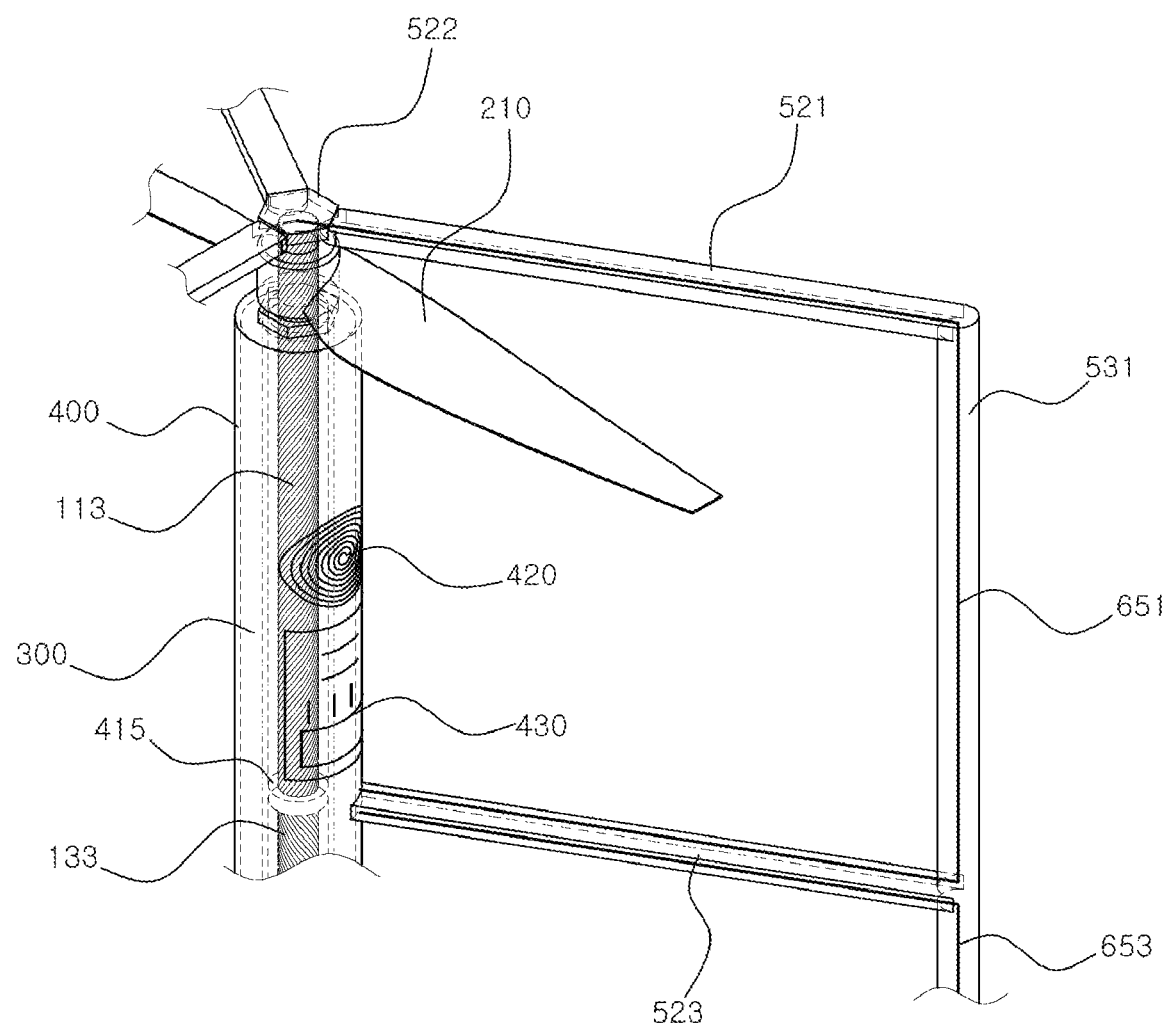
FIG. 6 is a perspective view of a circuit disposed in a guard unit and a circuit embedded in a body of a subminiature drone including a rotary artificial muscle motor according to one example embodiment of the present invention.

FIG. 5 is an enlarged isometric view of a case in which a wireless signal transceiver and a high-voltage pulse wave generation controller are provided in a subminiature drone including a rotary artificial muscle motor equipped according to one example embodiment of the present invention. FIG. 6 is a perspective view of a circuit disposed in a guard unit and a circuit embedded in a body of a subminiature drone including a rotary artificial muscle motor according to one example embodiment of the present invention.

Referring to FIGS. 5 and 6, a wireless signal transceiver 420 may be embedded in the outermost wall of the body 400, specifically, a portion of an outer wall of the battery accommodation portion. The wireless signal transceiver 420 may be provided to transmit or receive wireless signals such that a user may wirelessly control the subminiature drone of the present invention. For the wireless signal transceiver 420, a common wireless signal transceiver material may be used.

In addition, a high-voltage pulse wave generation controller 430 may be embedded in the outermost wall of the body 400, specifically, another portion of the outer wall of the battery accommodation portion.

Referring to FIGS. 3 and 6 simultaneously, the high-voltage pulse wave generation controller 430 may be electrically connected to the battery 300 to generate high-voltage pulse waves through power received from the battery 300. Specifically, wires 611 and 613 respectively connected to the positive electrode tab 311 and the negative electrode tab 331 of the battery 300 and embedded in the body 400 may be connected to the high-voltage pulse wave generation controller 430.

The high-voltage pulse wave generation controller 430 may be electrically connected to the upper artificial muscle motor 110 and the lower artificial muscle motor 130 to transmit the generated high-voltage pulse waves to the upper artificial muscle motor 110 and the lower artificial muscle motor 130. To this end, two wires 631 and 633 from the high-voltage pulse wave generation controller 430 may be embedded in the body 400 and may be respectively connected to one end of the upper driving motor part 113 and one end of the lower driving motor part 133, each fixed to the central fixing member 415. In addition, two other wires 651 and 653 from the high-voltage pulse wave generation controller 430 may be embedded in the guard unit 523, 531, and 521 and may be respectively connected to an uppermost end of the upper return spring part 111 coupled to the upper fixing member 522 and a lowermost end of the lower return spring part 131 coupled to the lower fixing member 526.

In addition, various sensors (not shown) may be provided inside or outside the body 400 according to example embodiments. The subminiature drone of the present invention may be equipped with various sensors and implemented as a subminiature smart dust drone.

Figure 7:
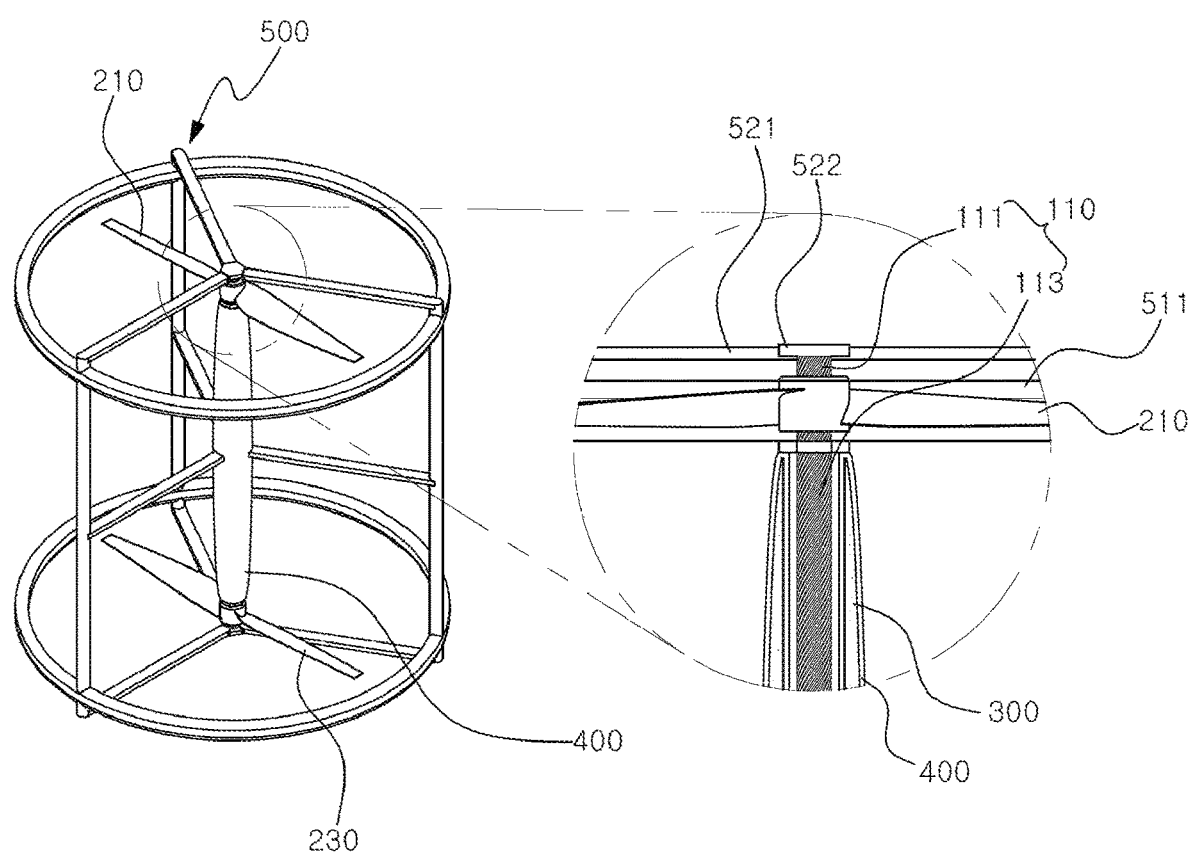
FIG. 7 shows an isometric view and a cross-sectional view of a case in which a streamlined battery is mounted in a subminiature drone including a rotary artificial muscle motor according to one example embodiment of the present invention.

FIG. 7 shows an isometric view and a cross-sectional view of a case in which a subminiature drone including a rotary artificial muscle motor has a streamlined body according to one example embodiment of the present invention. The subminiature drone according to the present example embodiment is substantially the same as the subminiature drone described above except for the following descriptions.

Referring to FIG. 7, a body may have a streamlined shape in which a cross-sectional diameter of a central portion is the largest and a cross-sectional diameter gradually decreases toward an upper portion and a lower portion. To this end, the outer wall of a battery accommodation portion accommodating a battery 300 installed outside upper and lower hollow rods 411 and 413 respectively accommodating upper and lower driving motor parts 113 and 133 may have a streamlined structure. As a result, drag generated through air resistance can be minimized.

Another aspect of the present invention provides a method of operating a subminiature drone which includes providing a subminiature drone including an upper artificial muscle motor which has any one twist of a Z twist twisted clockwise and an S twist twisted counterclockwise, a lower artificial muscle motor which has the other twist of the Z twist twisted clockwise and the S twist twisted counterclockwise, wherein the upper artificial muscle motor and the lower artificial muscle motor are vertically disposed on the same axis, a first propeller and a second propeller which are respectively disposed at a portion of an upper portion of the upper artificial muscle motor and a portion of a lower portion of the lower artificial muscle motor, a battery electrically connected to the upper artificial muscle motor and the lower artificial muscle motor, and a body which accommodates the upper artificial muscle motor, the lower artificial muscle motor, and the battery. A driving voltage received from the battery is applied to both ends of the upper artificial muscle motor and both ends of the lower artificial muscle motor so that the upper artificial muscle motor and the lower artificial muscle motor to which the driving voltage is applied rotate into an untwisted state and the first propeller and the second propeller rotate in opposite directions by receiving rotational forces from the upper artificial muscle motor and the lower artificial muscle motor, which rotate into the untwisted state. The driving voltage is removed or a reference voltage less than the driving voltage is applied to the upper artificial muscle motor and the lower artificial muscle motor so that the upper artificial muscle motor and the lower artificial muscle motor rotate into twisted state and the first propeller and the second propeller rotate in opposite directions by receiving rotational forces from the upper artificial muscle motor and the lower artificial muscle motor, which rotate into the twisted state.

Hereinafter, the method of operating a subminiature drone of the present invention will be described.

Figure 8:
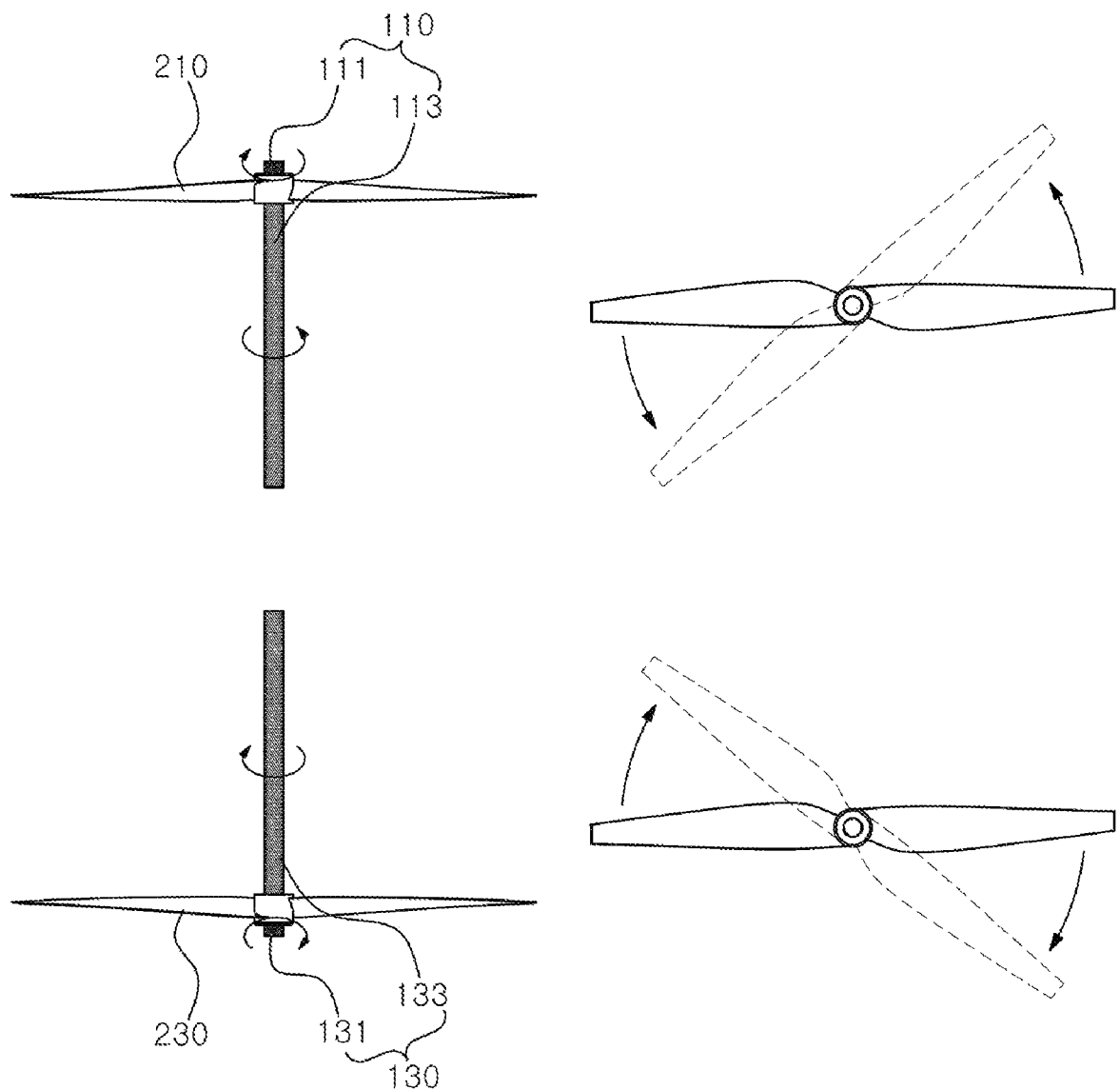
FIG. 8 is a schematic view illustrating the rotation of a rotary artificial muscle motor and the rotation of a propeller when a voltage is applied to a subminiature drone including the rotary artificial muscle motor according to one example embodiment of the present invention.
Figure 9:
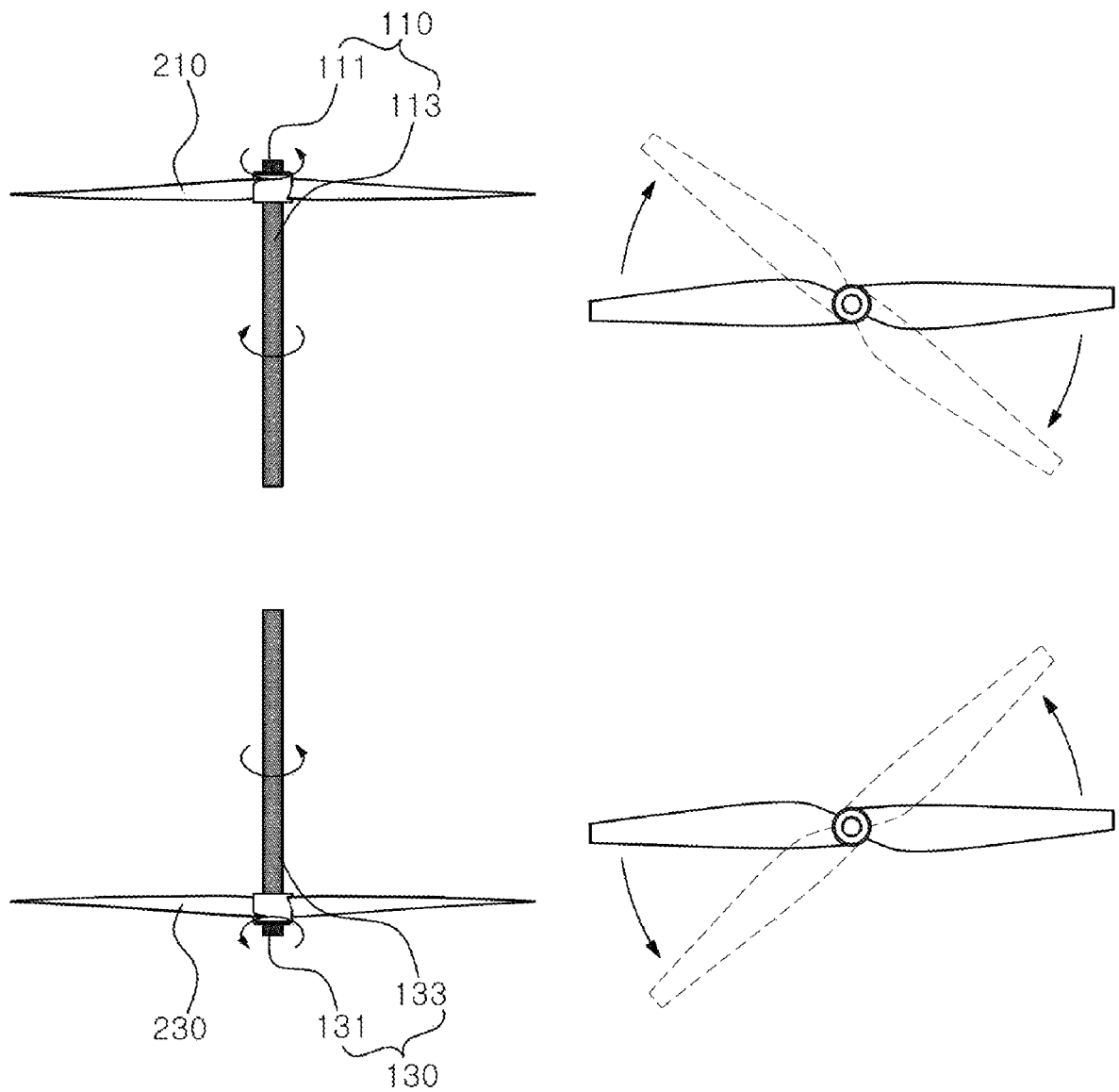
FIG. 9 is a schematic view illustrating the rotation of the rotary artificial muscle motor and the rotation of the propeller when a voltage is not supplied to the subminiature drone including the rotary artificial muscle motor according to one example embodiment of the present invention.

FIG. 8 is a schematic view illustrating the rotation of a rotary artificial muscle motor and the rotation of a propeller when a voltage is applied to the subminiature drone including the rotary artificial muscle motor according to one example embodiment of the present invention. FIG. 9 is a schematic view illustrating the rotation of the rotary artificial muscle motor and the rotation of the propeller when a voltage is not supplied to the subminiature drone including the rotary artificial muscle motor according to one example embodiment of the present invention.

Referring to FIGS. 8, 9, and 1 to 3, a user may drive or stop driving a battery 300 through a wireless signal transceiver 420 provided in a body 400. When the battery 300 starts to be driven, the battery 300 may supply power to a high-voltage pulse wave generation controller 430 electrically connected thereto, and the high-voltage pulse wave generation controller 430 may generate high-voltage pulse waves to apply a voltage to both ends of an upper artificial muscle motor 110 and both ends of a lower artificial muscle motor 130. In addition, when the battery 300 starts to stop driving, the voltage applied to the upper artificial muscle motor 110 and the lower artificial muscle motor 130 may not be supplied.

Referring to FIGS. 8 and 1 to 3, when a driving voltage is applied to the upper artificial muscle motor 110, as a volume of a first polymer in the upper driving motor part 113 expands due to Joule heat generated from a carbon nanotube yarn, the upper driving motor part 113 may rotate in a direction opposite to a twist (counterclockwise in the case of a Z twist) and may become untwisted. As a result, a first propeller 210 attached to an upper outer portion of an upper driving motor part 113 may rotate in the direction opposite to the twist of the upper driving motor part 113 (counterclockwise in the case of the Z twist). In this case, since the total number of twists of the upper artificial muscle motor 110 should be maintained, when the upper driving motor part 113 rotates into an untwisted state, an upper return spring part 111 may rotate in a twisting direction (clockwise in the case of the Z twist). In other words, when a driving voltage is applied to the upper artificial muscle motor 110, the upper driving motor part 113 may rotate in an untwisting direction, and the upper return spring part 111 may rotate in a twisting direction to be further twisted.

Likewise, when a driving voltage is applied to the lower artificial muscle motor 130, as a volume of a second polymer in a lower driving motor part 133 expands due to Joule heat generated from a carbon nanotube yarn, the lower driving motor part 133 may rotate in a direction opposite to a twist (clockwise in the case of an S twist) and may become untwisted. As a result, a second propeller 230 attached to an upper outer portion of the lower driving motor part 133 may rotate in the direction opposite to the twist of the lower driving motor part 133 (counterclockwise in the case of the S twist). In this case, since the total number of twists of the lower artificial muscle motor 130 should be maintained, when the lower driving motor part 133 rotates in an untwisted state, a lower return spring part 131 may rotate in a twisting direction (counterclockwise in the case of the S twist). In other words, when a driving voltage is applied to the lower artificial muscle motor 130, the lower driving motor part 133 may rotate in a untwisting direction, and the lower return spring part 131 may rotate in a twisting direction to be further twisted.

In this way, when a driving voltage is applied to both ends of the upper artificial muscle motor 110 and both ends of the lower artificial muscle motor 130, and when the upper artificial muscle motor 110 has a Z twist and the lower artificial muscle motor 130 has an S twist, the upper driving motor part 113 may rotate in an untwisting direction (counterclockwise in the case of the Z twist) to rotate the first propeller 210 that is a CCW propeller counterclockwise, and also, the lower driving motor part 133 may rotate in an untwisting direction (clockwise in the case of the S twist) to rotate the second propeller 230 that is a CW propeller clockwise. Thus, the first and second propellers 210 and 230 may push air downward so that the subminiature drone according to one example embodiment of the present invention may ascend.

Referring to FIGS. 9 and 1 to 3, afterwards, when the driving voltage applied to the upper artificial muscle motor 110 is not supplied or a reference voltage less than the driving voltage is applied, as the expanded first polymer contracts, the untwisted upper driving motor part 113 may rotate in the original twisting direction (clockwise in the case of the Z twist). As a result, the first propeller 210 attached to the upper outer portion of the upper driving motor part 113 may rotate in a twisting direction of the upper driving motor part 113 (clockwise in the case of the Z twist). However, a speed of the rotation may not be high. Meanwhile, as described with reference to FIG. 8, the upper return spring part 111, which has been further twisted by rotating in the twisting direction when a driving voltage is applied to the upper artificial muscle motor 110, may rotate in a direction opposite to the twisting direction (counterclockwise in the case of the Z twist) to recover the original number of twists. In this case, since the total number of twists of the upper artificial muscle motor 110 should be maintained, the rotation of the upper return spring part 111 in the direction opposite to the twisting direction (counterclockwise in the case of the Z twist) may enable the upper driving motor part 113 to rotate faster in the twisting direction (clockwise in the case of the Z twist). The operation of the upper return spring part 111 is because both ends of the upper return spring part 111 are fixed to the first propeller 210 and a guard unit 500, and unlike the upper driving motor part 113, the first polymer material is not impregnated.

When the driving voltage applied to the lower artificial muscle motor 130 is not supplied or a reference voltage less than the driving voltage is applied, as the expanded second polymer contracts, the untwisted lower driving motor part 133 may rotate in the original twisting direction (counterclockwise in the case of the S twist). As a result, the second propeller 230 attached to the upper outer portion of the lower driving motor part 133 may rotate in a twisting direction of the lower driving motor part 133 (counterclockwise in the case of the S twist). However, a speed of the rotation may not be high. Meanwhile, as described with reference to FIG. 8, the lower return spring part 131, which has been further twisted by rotating in the twisting direction when the driving voltage is applied to the lower artificial muscle motor 130, may rotate in a direction opposite to the twisting direction (clockwise in the case of the S twist) to recover the original number of twists. In this case, since the total number of twists of the lower artificial muscle motor 130 should be maintained, the rotation of the lower return spring part 131 in the direction opposite to the twisting direction (clockwise in the case of the S twist) may enable the lower driving motor part 133 to rotate faster in the twisting direction (counterclockwise in the case of the S twist). The operation of the lower return spring part 131 is because both ends of the lower return spring part 131 are fixed to the second propeller 230 and the guard unit 500, and unlike the lower driving motor part 133, the second polymer is not impregnated.

In this way, when the applied driving voltage is not supplied or a reference voltage less than a driving voltage is applied, and when the upper and lower driving motor parts 113 and 133 return to the original twisted state, as rotational forces received by the upper and lower return spring parts 111 and 131 are transmitted to the upper and lower driving motor parts 113 and 133, the return of the upper and lower driving motor parts 113 and 133 may be achieved more quickly.

As described above, when the upper artificial muscle motor 110 has a Z twist and the lower artificial muscle motor 130 has an S twist, and when the driving voltage applied to both ends of the upper artificial muscle motor 110 and both ends of the lower artificial muscle motor 130 is not supplied or a reference voltage less than the driving voltage is applied, the upper driving motor part 113 may rotate in a twisting direction (clockwise in the case of the Z twist) to rotate the first propeller 210 that is a CCW propeller clockwise, and also, the lower driving motor part 133 may rotate in a twisting direction (counterclockwise in the case of the S twist) to rotate the second propeller 230 that is a CW propeller counterclockwise. Thus, the first and second propellers 210 and 230 may push air upward so that the subminiature drone according to one example embodiment of the present invention may descend.

Figure 10:
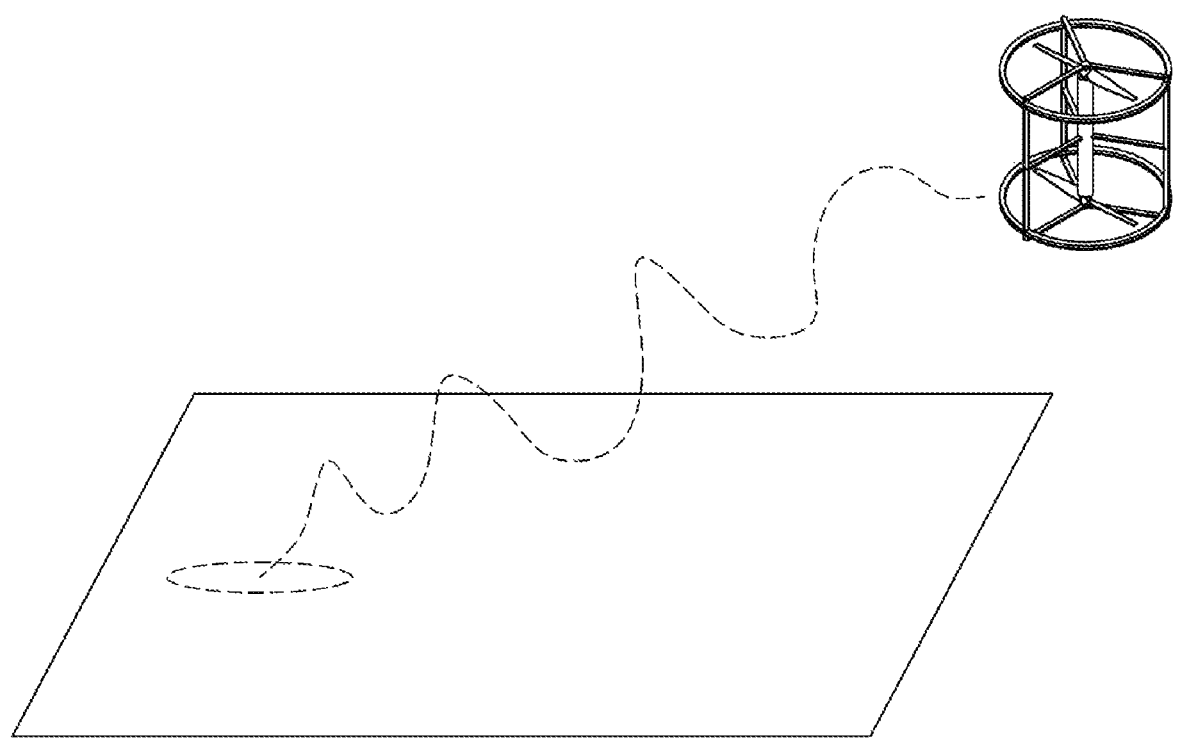
FIG. 10 is a schematic view illustrating the flight of a subminiature drone including a rotary artificial muscle motor according to one example embodiment of the present invention.

FIG. 10 is a schematic view illustrating the flight of a subminiature drone including a rotary artificial muscle motor according to one example embodiment of the present invention.

As shown in FIG. 10, the subminiature drone of the present invention may fly by repeatedly ascending and descending, which may be different from drones that fly by being powered by existing electric motors. The subminiature drone that flies by being powered by the rotary artificial muscle motor of the present invention may be repeatedly twisted and untwisted according to whether a voltage is applied to repeatedly induce the forward and reverse rotation of a propeller so that the subminiature drone may fly.

In the subminiature drone of the present invention, a user may adjust the ascent, descent, and rotation of the drone by modulating a frequency and width of a pulse-type voltage applied to each of an upper artificial muscle motor 110 and a lower artificial muscle motor 130 through a wireless signal transceiver 420 and a high-voltage pulse wave generation controller 430.

Table 1 below is a table showing a flight form of the drone according to a voltage applied to the artificial muscle motors of the subminiature drone including the rotary artificial muscle motor according to one example embodiment of the present invention.

TABLE 1

| Flight form | voltage applied to artificial muscle motor with Z twist | voltage applied to artificial muscle motor with S twist | frequency comparison of applied pulse wave voltage |
|---|---|---|---|
| Vertical ascent | Driving voltage (for example, 5 V) | Driving voltage (for example, 5 V) | Same |
| Vertical descent | Reference voltage (for example, 0 V) | Reference voltage (for example, 0 V) | Same |
| Left-turn ascent | Driving voltage (for example, 5 V) | Driving voltage (for example, 5 V) | Higher frequency applied to artificial muscle motor positioned at lower level among artificial muscle motors |
| Right-turn ascent | Driving voltage (for example, 5 V) | Driving voltage (for example, 5 V) | Higher frequency applied to artificial muscle motor positioned at higher level among artificial muscle motors |
| Left-turn descent | Driving voltage (for example, 5 V) | Reference voltage (for example, 0 V) | Same |
| Right-turn descent | Reference voltage (for example, 0 V) | Driving voltage (for example, 5 V) | Same |

Referring to Table 1 above, flight forms made possible with a coaxial inverted rotor structure including an upper artificial muscle motor and a lower artificial muscle motor include vertical ascent, vertical descent, left-turn ascent, right-turn ascent, left-turn descent, and right-turn descent. It can be seen that climb thrust during left-turn ascent and right-turn ascent increases as a frequency difference decreases, and a degree of rotation increases as a frequency difference increases.

One example of the ascent, descent, and rotation of the drone in a case in which the upper artificial muscle motor 110 has a Z twist and the lower artificial muscle motor 130 will be described below.

The drone may be allowed to vertically ascend by applying the same driving voltage at the same frequency to the upper artificial muscle motor 110 and the lower artificial muscle motor 130, and the drone may be allowed to vertically descend by applying the same reference voltage (for example, 0V) to the upper artificial muscle motor 110 and the lower artificial muscle motor 130 at the same frequency. In addition, when the same driving voltage is applied to the upper artificial muscle motor 110 and the lower artificial muscle motor 130, and a higher frequency is applied to the lower artificial muscle motor 130 as compared with the upper artificial muscle motor 110, the drone may be turned left to ascend. When the same driving voltage is applied to the upper artificial muscle motor 110 and the lower artificial muscle motor 130, and a higher frequency is applied to the upper artificial muscle motor 110 as compared with the lower artificial muscle motor 130, the drone may be turned right to ascend. In addition, when a driving voltage is applied to the upper artificial muscle motor 110, a reference voltage (for example, 0V) is applied to the lower artificial muscle motor 130, and frequencies of the applied voltages are the same, the drone may be turned left to descend. When a reference voltage (for example, 0V) is applied to the upper artificial muscle motor 110, a driving voltage is applied to the lower artificial muscle motor 130, and frequencies of the applied voltages are the same, the drone may be turned right to descend. Specifically, a high-voltage pulse wave of 0.5 V/mm to 1.0 V/mm may be applied to the upper artificial muscle motor 110 and the lower artificial muscle motor 130 from the high-voltage pulse wave generation controller 430. The high-voltage pulse wave may have a frequency of 5 Hz to 15 Hz, and a pulse width modulation (PWM) wave or a pulse frequency modulation (PFM) wave may be applied to the upper artificial muscle motor 110 and the lower artificial muscle motor 110 according to a flight situation of the subminiature drone of the present invention.

As described above, the present invention may provide a rotary artificial muscle motor based on a new type of subminiature and ultra-light carbon nanotube yarn capable of replacing existing electric motors that cannot be miniaturized. In addition, according to the present invention, wireless signal transmission/reception integrated circuits and various sensors may be easily disposed in a body using a microelectromechanical system technology (MEMS) to effectively apply a smart dust technology, thereby easily providing a subminiature smart dust drone.

The subminiature smart dust drone can maintain a safe living environment from disasters and accidents through ecological observation of air, soil, and water pollution. The subminiature smart dust drone is expected to be actively used for special purposes such as reconnaissance and danger detection through low-noise flight and its small size that is not detected by radar.

According to the present invention described above, a subminiature propeller can be effectively driven through a rotary artificial muscle motor, thereby implementing a subminiature drone with a size of 1 cm or less.

In addition, in a subminiature drone of the present invention, a structure of a motor as a flight power source can be simplified by applying a rotary artificial muscle motor using a principle of repeatedly implementing untwisting and twisting through expansion and contraction of polymer materials.

In addition, in a subminiature drone of the present invention, a user can easily control the subminiature drone by determining whether to apply a voltage and adjusting a frequency of the applied voltage through a high-voltage pulse wave generation controller connected to a wireless signal transmitter.

The technical effects of the present invention are not limited to those described above, and other technical effects that are not described may become apparent to those of ordinary skill in the art based on the following descriptions.

The invention claimed is:
1. A subminiature drone comprising:
an upper artificial muscle motor and a lower artificial muscle motor, each configured to generate rotational forces by being twisted and untwisted, the upper and lower artificial muscle motors being vertically disposed on a same axis, wherein the upper artificial muscle motor has one of a Z twist which is a clockwise twist and an S twist which is a counterclockwise twist, and the lower artificial muscle motor has the other of the Z twist and the S twist;
a first propeller and a second propeller which are respectively disposed at an upper portion of the upper artificial muscle motor and a lower portion of the lower artificial muscle motor,
wherein:
when the upper artificial muscle motor has the Z twist and the lower artificial muscle motor has the S twist, the first propeller is a counterclockwise (CCW) propeller and the second propeller is a clockwise (CW) propeller; or
when the upper artificial muscle motor has the S twist and the lower artificial muscle motor has the Z twist, the first propeller is a clockwise (CW) propeller and the second propeller is a counterclockwise (CCW) propeller;
a battery electrically connected to the upper artificial muscle motor and the lower artificial muscle motor; and
a body configured to accommodate the upper artificial muscle motor, the lower artificial muscle motor, and the battery,
wherein:
when a driving voltage is applied from the battery to both ends of the upper artificial muscle motor and both ends of the lower artificial muscle motor, the upper and lower artificial muscle motors rotate into an untwisted state, and the first propeller and the second propeller rotate in opposite directions against each other by receiving rotational forces from the upper and lower artificial muscle motors in their untwisted state; and
when the driving voltage is removed or a reference voltage less than the driving voltage is applied from the battery to the upper and lower artificial muscle motors, the upper and lower artificial muscle motors rotate into a twisted state, and the first propeller and the second propeller rotate in the opposite directions against each other by receiving the rotational forces from the upper and lower artificial muscle motors in their twisted state.

2. The subminiature drone of claim 1, further comprising a guard unit configured to accommodate the first propeller, the second propeller, and the body, and to fix each of an uppermost end of the upper artificial muscle motor and a lowermost end of the lower artificial muscle motor.

3. The subminiature drone of claim 2, wherein the guard unit includes:
two or more upper fixing frames, each having a central portion coupled to the uppermost end of the upper artificial muscle motor and being disposed radially therefrom,
two or more lower fixing frames, each having a central portion coupled to the lowermost end of the lower artificial muscle motor and being arranged radially therefrom, and
two or more support frames, each disposed upright between the upper fixing frames and the lower fixing frames to support the upper fixing frames and the lower fixing frames.

4. The subminiature drone of claim 3, wherein the upper fixing frames are disposed at a higher level than the first propeller and are longer than the first propeller, and the lower fixing frames are disposed at a lower level than the second propeller and are longer than the second propeller.

5. The subminiature drone of claim 3, wherein the guard unit further includes an upper fixing member disposed at the central portion of the two or more upper fixing frames to fix the uppermost end of the upper artificial muscle motor, and a lower fixing member disposed at the central portion of the two or more lower fixing frames to fix the lowermost end of the lower artificial muscle motor.

6. The subminiature drone of claim 3, wherein the guard unit further includes a plurality of central fixing frames coupled to an outermost wall of the body, arranged radially around the body, and connected to the support frames.

7. The subminiature drone of claim 4, wherein the guard unit further includes an upper circular frame positioned at a same level as the first propeller and coupled to the support frames, and a lower circular frame positioned at a same level as the second propeller and coupled to the support frames.

8. The subminiature drone of claim 1, wherein the upper artificial muscle motor includes:
an upper return spring part formed of a carbon nanotube yarn having one of the Z twist and the S twist; and
an upper driving motor part in which a first polymer material is impregnated in the carbon nanotube yarn having the same twist as the upper return spring part, wherein the first propeller is connected to the upper driving motor part.

9. The subminiature drone of claim 8, wherein the upper return spring part and the upper driving motor part have a size ratio of 1:9 to 3:7.

10. The subminiature drone of claim 8, wherein the first polymer material includes a material having a glass-transition temperature (Tg) ranging from 40° C. to 80° C.

11. The subminiature drone of claim 1, wherein the lower artificial muscle motor includes:
a lower return spring part formed of a carbon nanotube yarn having the one of the Z twist and the S twist, and
a lower driving motor part in which a second polymer material is impregnated in the carbon nanotube yarn having the same twist as the lower return spring part, wherein the second propeller is connected to the lower driving motor part.

12. The subminiature drone of claim 11, wherein the lower return spring part and the lower driving motor part have a size ratio of 1:9 to 3:7.

13. The subminiature drone of claim 11, wherein the second polymer material includes a material having a glass-transition temperature (Tg) ranging from 40° C. to 80° C.

14. The subminiature drone of claim 1, wherein the body includes an upper hollow rod configured to accommodate the upper artificial muscle motor therein; a lower hollow rod configured to accommodate the lower artificial muscle motor therein; and a central fixing member disposed between the upper hollow rod and the lower hollow rod, coupled to the upper hollow rod and the lower hollow rod, and configured to fix a lowermost end of the upper artificial muscle motor and an uppermost end of the lower artificial muscle motor.

15. The subminiature drone of claim 14, wherein the body further includes a battery accommodation portion disposed around outer walls of the upper hollow rod and the lower hollow rod and configured to accommodate the battery.

16. The subminiature drone of claim 1, wherein the upper artificial muscle motor or the lower artificial muscle motor includes a carbon nanotube yarn having a twist of 3,000 twists per meter (TPM) or more.

17. A method of operating a subminiature drone, the method comprising:
providing a subminiature drone including:
an upper artificial muscle motor and a lower artificial muscle motor vertically disposed on a same axis, wherein the upper artificial muscle motor has one of a Z twist which is a clockwise twist and an S twist which is a counterclockwise twist, and the lower artificial muscle motor has the other of the Z twist and the S twist;
a first propeller and a second propeller which are respectively disposed at an upper portion of the upper artificial muscle motor and a lower portion of the lower artificial muscle motor;
a battery electrically connected to the upper artificial muscle motor and the lower artificial muscle motor; and
a body configured to accommodate the upper artificial muscle motor, the lower artificial muscle motor, and the battery;
applying a driving voltage received from the battery to both ends of the upper artificial muscle motor and both ends of the lower artificial muscle motor, so that the upper artificial muscle motor and the lower artificial muscle motor rotate into an untwisted state, wherein the first propeller and the second propeller rotate in opposite directions against each other by receiving rotational forces from the untwisted upper and lower artificial muscle motors; and
removing the driving voltage or applying a reference voltage less than the driving voltage to the upper and lower artificial muscle motors, so that the upper and lower artificial muscle motors rotate into a twisted state, wherein the first propeller and the second propeller rotate in the opposite directions against each other by the receiving rotational forces from the twisted upper and lower artificial muscle motors.

18. The method of claim 17, wherein, in the subminiature drone, the upper artificial muscle motor further includes:
an upper return spring part formed of a carbon nanotube yarn having the one of the Z twist and the S twist; and
an upper driving motor part in which a first polymer is impregnated in a carbon nanotube yarn having the same twist as the upper return spring part, wherein the first propeller is connected to the upper driving motor part, wherein:

when the driving voltage is applied to the upper artificial muscle motor, as a volume of the first polymer in the upper driving motor part expands due to Joule heat generated from the carbon nanotube yarn, the upper driving motor part rotates in a direction opposite to the twist to become untwisted; and when the driving voltage applied to the upper artificial muscle motor is removed or a reference voltage less than the driving voltage is applied, as the expanded first polymer contracts, the untwisted upper driving motor part rotates in an original twisting direction.

19. The method of claim 18, wherein, when the upper driving motor part rotates into the untwisted state, the upper return spring part rotates in a twisting direction to be further twisted, and when the upper driving motor part rotates in the twisted state, the upper return spring part rotates in a direction opposite to the twisting direction to restore the original number of twists.

20. The method of claim 17, wherein, in the subminiature drone, the lower artificial muscle motor further includes:

a lower return spring part formed of a carbon nanotube yarn having the one of the Z twist and the S twist; and a lower driving motor part in which a second polymer is impregnated in the carbon nanotube yarn having the same twist as the lower return spring part, wherein the second propeller is connected to the lower driving motor part, wherein:

when the driving voltage is applied to the lower artificial muscle motor, as a volume of the second polymer in the lower driving motor part expands due to Joule heat generated from the carbon nanotube yarn, the lower driving motor part rotates in a direction opposite to the twist to become untwisted; and when the driving voltage applied to the lower artificial muscle motor is removed or a reference voltage less than the driving voltage is applied, as the expanded second polymer material contracts, the untwisted lower driving motor part rotates in an original twisting direction.

21. The method of claim 20, wherein, when the lower driving motor part rotates into the untwisted state, the lower return spring part rotates in the twisting direction to be further twisted, and when the lower driving motor part rotates into the twisted state, the lower return spring part rotates in a direction opposite to the twisting direction to restore the original number of twists.

* * * * *